United States Patent Office.

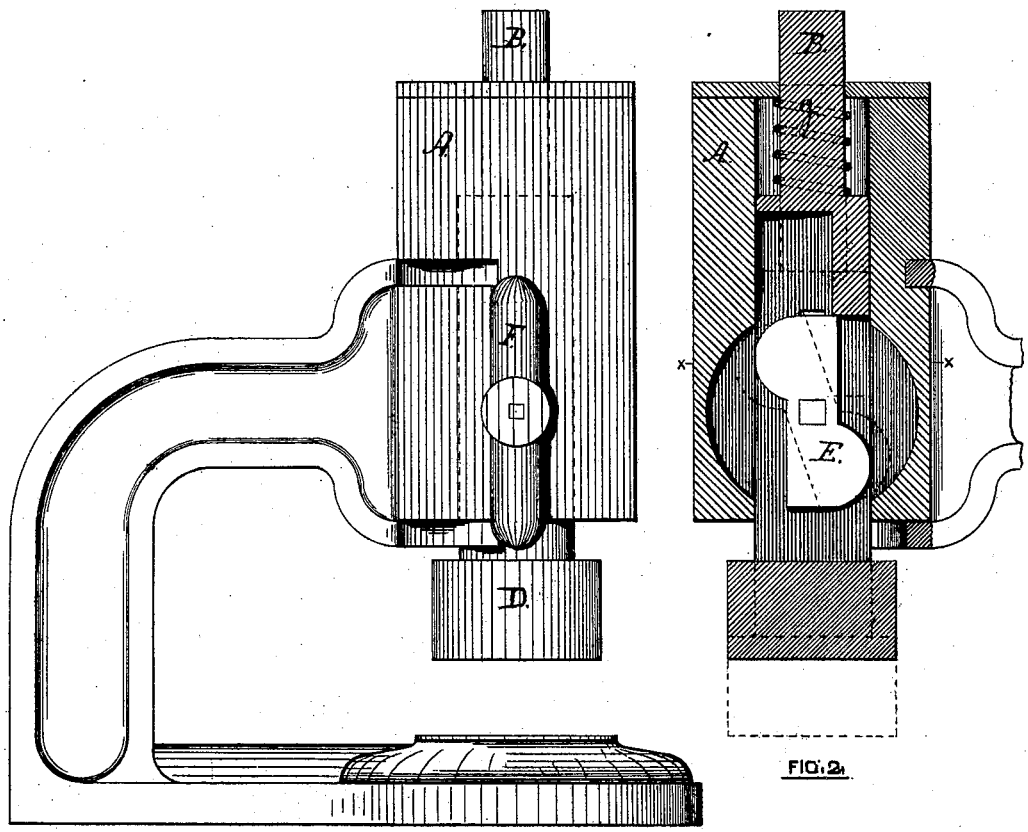

CHARLES G. TAFT, JR., OF NORTON, MASSACHUSETTS.

Letters Patent No. 114,879, dated May 16, 1871.

---

IMPROVEMENT IN HAND-STAMPS.

---

The Schedule referred to in these Letters Patent and making part of the same.

---

*To all whom it may concern:*

Be it known that I, CHARLES G. TAFT, Jr., of Norton, in the Commonwealth of Massachusetts, have invented a new and improved "Hand Canceling-Stamp;" and I do hereby declare that the following specification, taken in connection with the drawing making a part of the same, is a full, clear, and exact description thereof.

Figure 1 is a side view.

Figure 2 is a vertical section of stamping device.

Figure 3 is a transverse section of piston of stamping device on line $x$ $x$.

A is a cylinder, attached to a suitable frame, in which slides a piston, B, having upon its lower end a stamp, D.

The piston B is mortised in one direction to receive and permit the revolution of the peculiar-shaped lever E, and transversely to admit a small rod, which is attached at one end to the lever E, and at the other to the handle F.

The mortise that receives the lever E is longer upon one side of the piston than the other, the short side presenting a surface upon which the lever E acts.

The operation of my invention is now as follows:

The lever E being in a horizontal position the stamp D will occupy the position shown in Fig. 2 by the dotted lines.

I then take hold of the handle F with the left hand and turn it from me, when the lever E will revolve and press into the upper end of the mortise upon the short side, and, overcoming the resistance of the spring $g$, force up the piston, as shown in Fig. 2.

The lever E, continuing its revolution, passes into the long side of the mortise, and the upward pressure being suddenly removed the piston is forced sharply down by the spring $g$, and the stamp thus made to impress the paper.

This operation may be repeated in quick succession by continuing to turn the handle F.

What I claim as my invention, and desire to secure by Letters Patent, is—

The combination of the cylinder A, the piston B, and the double lever E, the whole constructed, arranged, and operating in the manner substantially as described.

CHARLES G. TAFT, JR.

Witnesses:
J. R. ROGERSON,
E. A. TAFT.